United States Patent [19]

Ogawa

[11] Patent Number: 5,302,416

[45] Date of Patent: * Apr. 12, 1994

[54] PROCESS FOR PRODUCING POLYACETYLENE OR POLYACENE TYPE LONG CONJUGATED POLYMERS

[75] Inventor: Kazufumi Ogawa, Hirakata, Japan

[73] Assignee: Matsushita Electric Industrial Co., Ltd., Osaka, Japan

[*] Notice: The portion of the term of this patent subsequent to Sep. 2, 2008 has been disclaimed.

[21] Appl. No.: 807,636

[22] Filed: Dec. 13, 1991

Related U.S. Application Data

[63] Continuation of Ser. No. 561,594, Aug. 1, 1990, abandoned, which is a continuation-in-part of Ser. No. 342,883, Apr. 25, 1989, abandoned.

[30] Foreign Application Priority Data

Apr. 28, 1988 [JP] Japan ................ 63-106309
Apr. 28, 1988 [JP] Japan ................ 63-106310

[51] Int. Cl.⁵ ............................................. B05D 1/20
[52] U.S. Cl. .................................. 427/341; 427/430.1; 427/443.1; 526/279
[58] Field of Search .............. 427/333, 341, 430.1, 427/443.1; 526/279, 285

[56] References Cited

U.S. PATENT DOCUMENTS

| | | | |
|---|---|---|---|
| 4,007,132 | 2/1977 | Rust et al. | 526/90 |
| 4,444,970 | 4/1984 | Weddigen | 526/90 |
| 4,452,959 | 6/1984 | Kobayashi et al. | 526/159 |
| 4,539,061 | 9/1985 | Sagiv | 156/278 |
| 4,567,245 | 1/1986 | Takamizawa et al. | 526/279 |
| 4,798,740 | 1/1989 | Tomida et al. | 427/43.1 |
| 5,008,127 | 4/1991 | Ogawa | 427/36 |
| 5,057,339 | 10/1991 | Ogawa | 427/340 |
| 5,102,686 | 4/1992 | Ogawa | 427/36 |

OTHER PUBLICATIONS

Masuda, Toshio, "Polymerization of Substituted Acetylenes by Group 5 and 6 Transition Metal Catalysts", *Organic Synthetic Chemistry*, vol. 43, No. 8, pp. 744-752 (1985).

Macromolecules, vol. 18, May 1985, pp. 841-845, American Chemical Society; T. Masuda et al.: "Polymerization of 1-(trimethylsilyl)-1-propyne by halides of niobium(V) and tatalum(V) and polymer properties".

Thin Solid Films, vol. 99, No. 1/2/3, Jan. 14, 1983, pp. 317-321, Elsevier Sequoia, Lausanne, CH; A. Barraud: "Polymerization in langmuir-blodgett films and resist applications".

*Primary Examiner*—Joseph L. Schofer
*Assistant Examiner*—R. H. Delmendo
*Attorney, Agent, or Firm*—Stevens, Davis, Miller & Mosher

[57] ABSTRACT

This invention relates to production of a super long conjugated polymer to be used for a molecular device, etc. According to this invention, an acetylene derivative is previously oriented and formed into a monomolecular film on the surface of a substrate and its acetylenic group is polymerized by a catalyst or by irradiation of an energy beam while keeping the orientation. Since the respective molecules are oriented and aligned on the substrate surface, the polymerization reaction readily proceeds, and after the polymerization the resulting polyacetylene molecules are prevented from the breakage of conjugated bonds caused by thermal agitation or twisting of the polyacetylene molecules. Accordingly, a polyacetylene or polyacene type polymer having long conjugated bonds can be obtained easily.

7 Claims, 10 Drawing Sheets

MONOMOLECULAR ADSORBED FILM 2

REACTION USING METAL HALIDE CATALYST

FIG.5A
H
|
C
|||
C
|
C
|||
C
|
(CH₂)₁₉
|
SiCl₃
FIG.5B
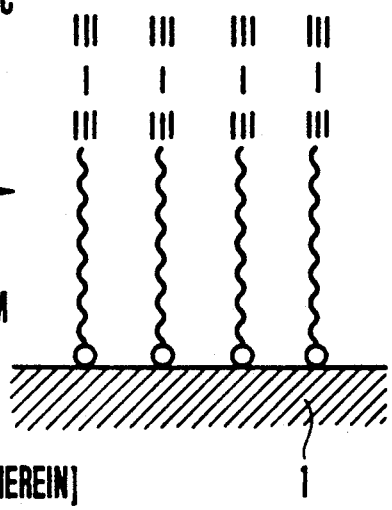
FORMATION OF CHEMICALLY ADSORBED FILM
FIG.5C
[ ○ REPRESENTS SiCl₃ HEREIN]
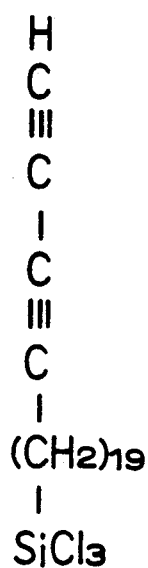
POLYMERIZATION USING METALLIC CATALYST
FIG.5D
TRANS-POLYACETYLENE BOND 3
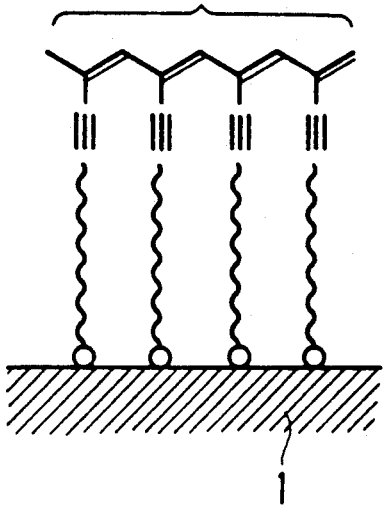
POLYMERIZATION BY IRRADIATION
FIG.5E
POLYACENE BOND 5

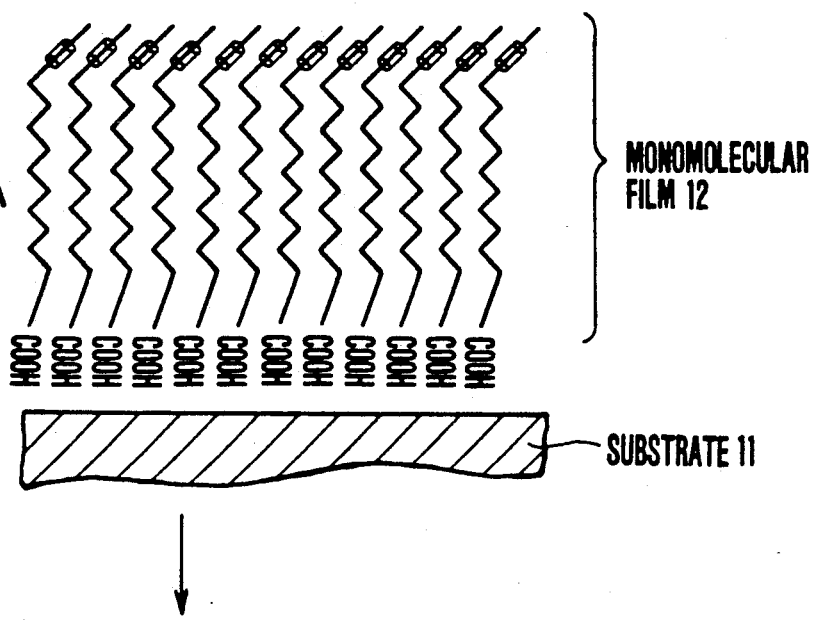
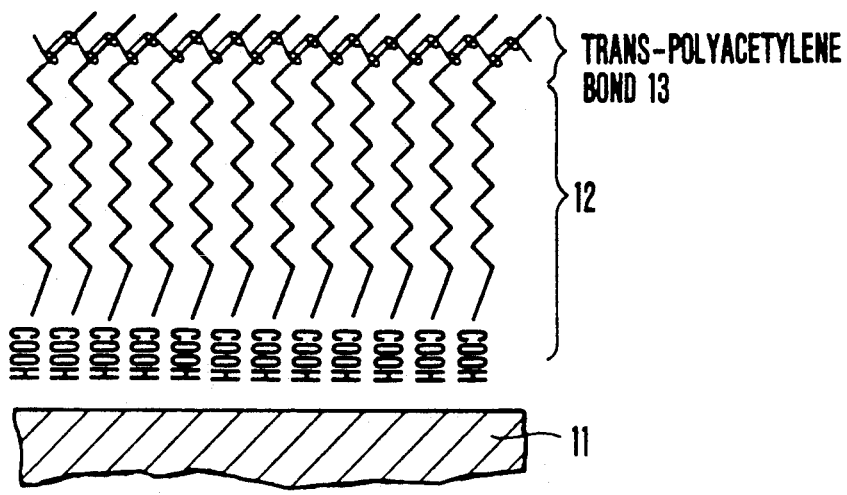

FIG.IOA        FIG.IOB        FIG.IOC
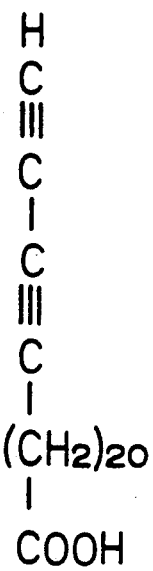
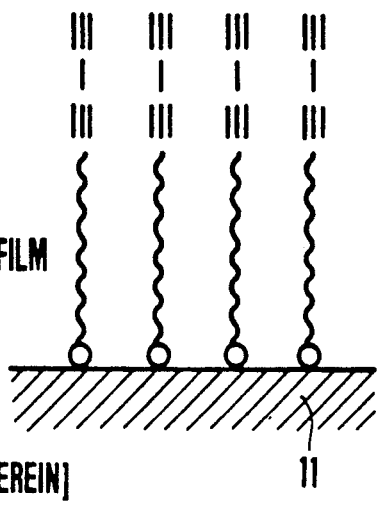
DIACETYLENIC GROUP 16
FORMATION OF LB FILM
[ ○ REPRESENTS COOH HEREIN]
POLYMERIZATION USING METALLIC CATALYST
FIG.IOD
TRANS-POLYACETYLENE BOND 13
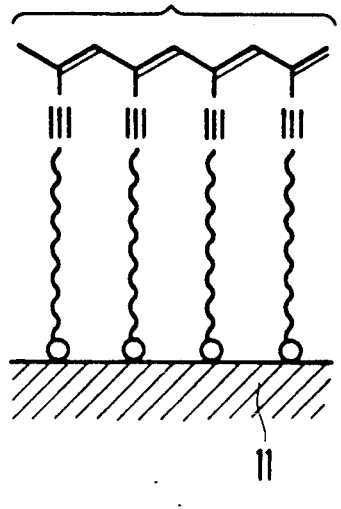
POLYMERIZATION BY IRRADIATION
FIG.IOE
POLYACENE BOND 15
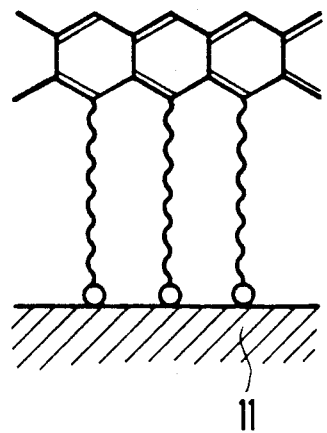

PROCESS FOR PRODUCING POLYACETYLENE OR POLYACENE TYPE LONG CONJUGATED POLYMERS

CROSS-REFERENCE TO RELATED APPLICATIONS

This application is a continuation of application Ser. No. 07/561,594, filed Aug. 1, 1990, now abandoned which in turn is a continuation-in-part of application Ser. No. 07/342,883, filed Apr. 25, 1989, now abandoned.

FIELD OF THE INVENTION

This invention relates to an electric material, and more particularly to an organic substance having a polyacetylenic bond and exhibiting electrical conductivity and nonlinear optical effect.

Since the polymers of acetylene derivatives involve a one-dimensional backbone having pai electron conjugated system in their molecule, they exhibit electrical conductivity and nonlinear optical effect. Thus, they are widely studied as a light- or electron-functional material.

In this connection, as the production process of a polyacetylene, the polymerization process reported by Shirakawa et al using Ziegler-Natta catalyst is well known.

However, polyacetylene derivatives known today are unstable to the action of heat, pressure or ultraviolet ray in oxygen-containing atmospheres. Thus, method for stabilization is being studied.

However, no method for stabilizing acetylene derivative polymers has been found.

It is known that, using a reagent having a straight hydrocarbon chain and a —Si—Cl group on one molecular end, a monomolecular film can be formed on the surface of a hydrophilic substrate by chemical adsorption in a non-aqueous organic solvent. It is also known that building-up the monomolecular films can be realized by the chemical adsorption method followed after irradiating the surface of the monomolecular film with a high energy beam in an oxygen-containing gas to make the hydrophilic film surface.

Accordingly, when a substance involving an acetylenic group in a part of the straight hydrocarbon chain is subjected to chemical adsorption, a monomolecular film of the acetylene derivative having a thickness of several tens angstrom order can be formed, and a cumulative film made of many monomolecular layers can also be obtained easily.

The present inventor has discovered that, when this prepared monomolecular film is dipped in an organic solvent containing a metal halide catalyst and the acetylenic group part of the monomolecular film is polymerized, a super high molecular weight polyacetylene having a very long conjugated bond and stable even in an oxygen-containing atmosphere can be obtained. That is, it has been found that a super high molecular weight straight chain polymer having a continuous long conjugated bond (hereinafter "long conjugated polymer" which is a polymer having a conjugated bond represented by

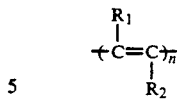

(wherein n represents an integer of at least several hundred and $R_1$ and $R_2$ represent hydrogen atoms or substituents) can be prepared by polymerizing the acetylene derivative molecules by the use of a metallic catalyst while maintaining the constant orientation of the molecules.

Thus, by dipping a substrate having a hydrophilic surface into a solution of a substance having an acetylenic group and chlorosilanyl group (—SiCl) dissolved in a nonaqueous organic solvent, and chemically adsorbing the substance having an acetylenic group and chlorosilanyl group onto the surface of the substrate, a monomolecular film of the substance having an acetylenic group and chlorosilanyl group can be prepared on the substrate in the state where the molecules are well aligned. Further, by polymerizing the chemically adsorbed film of the acetylene derivative formed on the specified substrate by the use of a metallic catalyst, a straight chain polyacetylene having a super high molecular weight and having a continuous conjugated bond can be produced while retaining the molecular orientation at the time of polymerization. For the polymerization reaction, a metal halide catalyst such as $MoCl_5$, $WCl_6$, $NbCl_5$, $TaCl_5$, $Mo(CO)_5$, $W(CO)_6$, $Nb(CO)_5$, $Ta(CO)_5$ or the like can be used. As the organic solvent, toluene, dioxane, anisole or the like can be used.

On the other hand, it is well known that a monomolecular film can be prepared on water surface if an oleohydrophilic acetylene derivative having both a hydrophobic group and a hydrophilic group is used, and that a built-up film can be formed by the Langmuir-Blodgett method (LB method).

LB method has been considered to be hopeful as a means for constructing molecular devices in the recent developmental studies of molecular devices in which a molecule itself has a function. According to LB method, a monomolecular film of an acetylene derivative having a thickness of several tens angstrom order can be prepared, and its cumulative film can also be prepared easily.

According to this invention, an acetylenic group-containing substance dissolved in an organic solvent is spread on water surface and the organic solvent is vaporized off, after which the molecules of the acetylenic group-containing substance remaining on the water surface are gathered with a barrier in the direction of water surface. Then, while applying a necessary surface pressure, a substrate is moved up and down to build-up the monomolecular film of the acetylene derivative on the substrate (this building-up method is called "Langmuir-Blodgett (LB) method", and the built-up monomolecular film prepared by this method is called "LB film"). Then, the substrate on which the built-up film is deposited, is dipped in an organic solvent containing a metal halide catalyst and the acetylenic group part of the monomolecular film is polymerized, whereby a polyacetylene type long conjugated polymer having a super high molecular weight and a very long conjugated bond and stable even in an oxygen-containing atmosphere is formed. That is, by polymerizing acetylene derivative molecules by the use of a metallic catalyst while retaining a constant orientation, a straight chain polymer having a super high molecular weight and a continuous conjugated bond (long conjugated polymer) is obtained.

Further, if a direct current bias is applied in the direction of surface at the time of building-up said LB film, a long conjugated polymer having a longer conjugated bond is obtained.

That is, by building-up LB film of an acetylene derivative on a specific substrate under a specified surface pressure and polymerizing the resulting built-up film with a metallic catalyst, a straight chain polyacetylene having a super high molecular weight and a continuous conjugated bond and retaining the same molecular orientation as that at the time of polymerization can be prepared.

Further, if a direct current bias is applied in the surface direction when the acetylene derivative molecules are gathered in the surface direction by a barrier on the water surface, orientation of the monomer molecules at the time of building-up is furthermore improved and a polyacetylene type long conjugated polymer having a longer conjugated bond can be produced.

FIGS. 5(a) to 5(e) are conceptional diagrams of molecular order illustrating a process for producing a polyacene type long conjugated polymer.

FIG. 6(a) is an enlarged sectional conceptional view, in molecular order, of a substrate on which one layer of TCA ($\omega$-tricosynoic acid) LB film is formed;

FIG. 6(b) is an enlarged sectional conceptional view, in molecular order, of a substrate on which a trans-polyacetylene has been formed by polymerization;

FIGS. 10(a) to 10(e) are conceptional diagrams of molecular order illustrating a process for producing a polyacene type super long conjugated polymer.

Next, referring to examples, this invention will be explained in more detail.

EXAMPLE 1

(i) In this example, a case using $\omega$-nonadecylynoic trichlorosilane (NTS: $HC\equiv C-(CH_2)_n-SiCl_3$, n=17) which is a kind of acetylene derivative and has one acetylenic group on the molecular end, will be mentioned. (Though n was 17 in this example, good results were obtained also when n was in the range of 14 to 24).

Figure 1A:
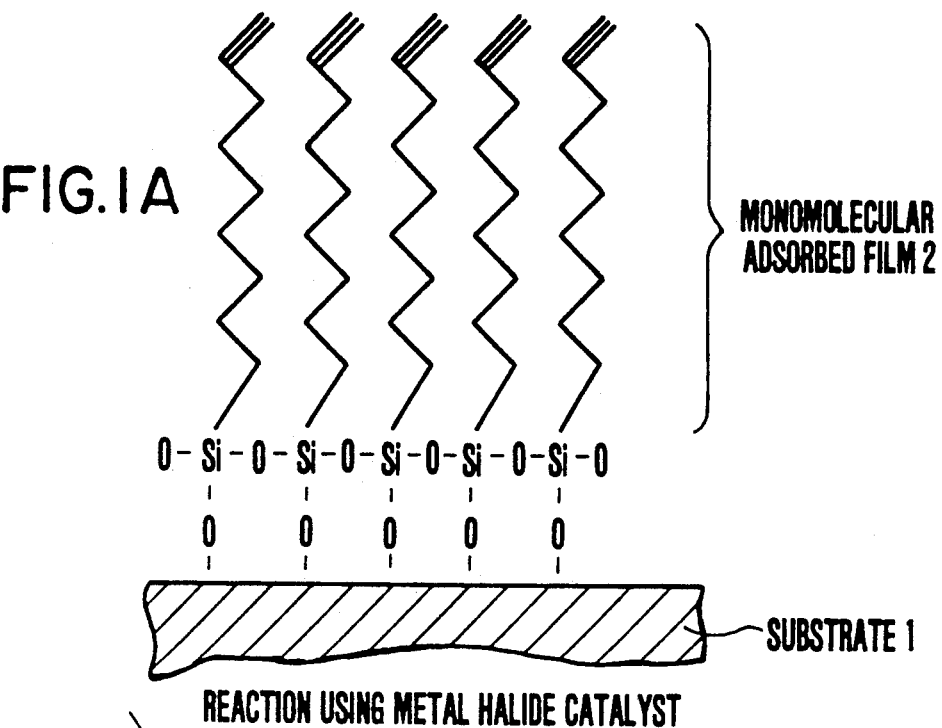
FIG. 1(a) is an enlarged sectional conceptional view, in molecular order, of a substrate on which one layer of NTS ($\omega$-nonadecylynoic trichlorosilane) adsorbed film is formed.

For example, by chemical adsorption a monomolecular film of NTS was formed on the surface of a Si substrate 1 on which $SiO_2$ had previously been formed. At the time of chemical adsorption, —SiCl group was reacted with the OH group formed on the substrate surface together with $SiO_2$ to cause dehydrochlorination. As the result, monomolecular film 2 of the following formula:

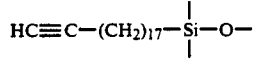

was formed on the substrate surface. Actually, when the Si substrate on which $SiO_2$ had previously been formed, was dipped in a solution of NTS (concentration: $2.0 \times 10^{-3}$ to $5.0 \times 10^{-3}$ mol/liter) in a solvent mixture consisting of 80% n-hexane, 12% carbon tetrachloride and 8% chloroform at room temperature for a few minutes, —Si—O— bond was formed on the surface of $SiO_2$ {cf. FIG. 1(a)}.

By means of FTIR, it was confirmed that monomolecular film 2 of the following formula:

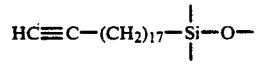

was formed on the substrate surface.

The preparation of this chemically adsorbed film was carried out in an atmosphere of nitrogen containing no moisture. Substrate 1 used for formation of the chemically adsorbed film was a Si substrate on which was formed an oxide film ($SiO_2$) having a diameter of 3 inches.

Figure 1B:
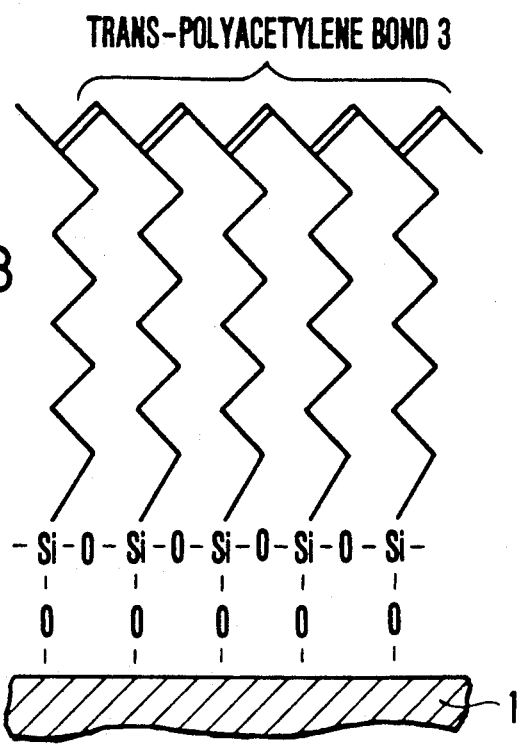
FIG. 1(b) is an enlarged sectional conceptional view, in molecular order, of a substrate on which a trans-polyacetylene has been formed by polymerization.

Next, the substrate on which one layer of NTS adsorbed film had been formed, was dipped in toluene having dissolved therein $MoCl_5$ as a metallic catalyst, and temperature of the solvent was elevated to about 30° to 70° C. Thus, a reaction shown in FIG. 1(b), i.e., a reaction catalyzed by the metal halide catalyst took place to form trans-polyacetylene bond 3. The formation of the trans-polyacetylene bond was confirmed by FTIR. When $WCl_6$, $NbCl_5$ or $TaCl_5$ was used as the catalyst, a similar polymeric film was obtained although the molecular weight was different from that in the above-mentioned case. Further, when the substrate was dipped in a solution of $Mo(CO)_6$ or $W(CO)_6$ catalyst in $CCl_4$ solvent and it was irradiated with ultraviolet ray, a reddish brown polymeric film was obtained although its molecular weight was different from the above.

Figure 2A:
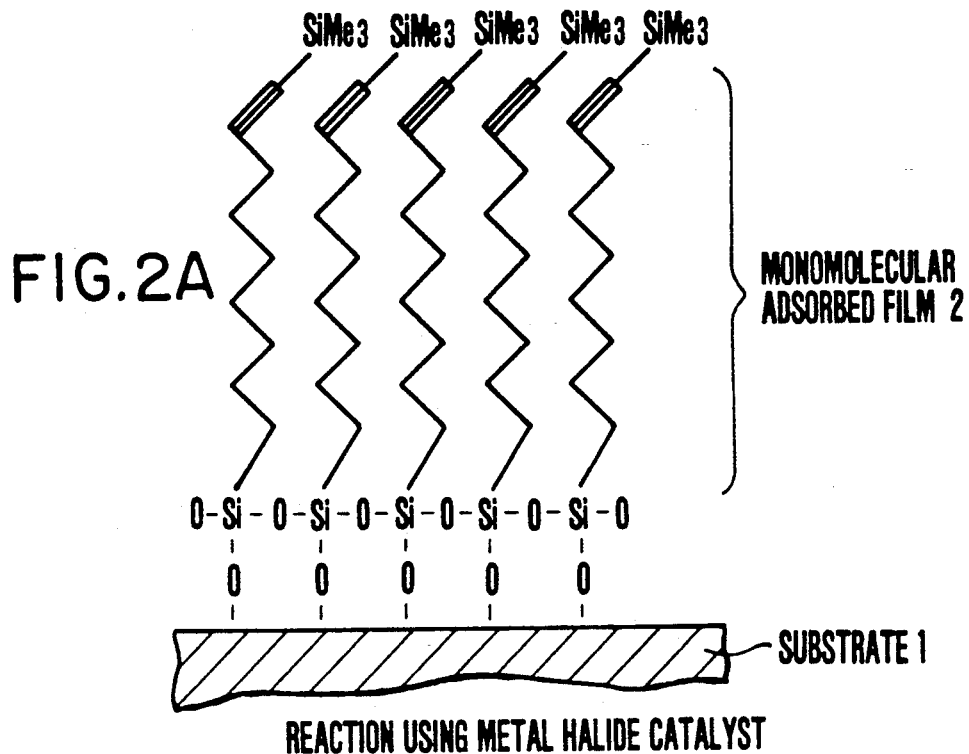
FIG. 2(a) is an enlarged sectional conceptional view, in molecular order, of a substrate on which one layer of TMS-NTS (1-(trimethylsilyl)-$\omega$-nonadecylynoic trichlorosilane) adsorbed film is formed.
Figure 2B:
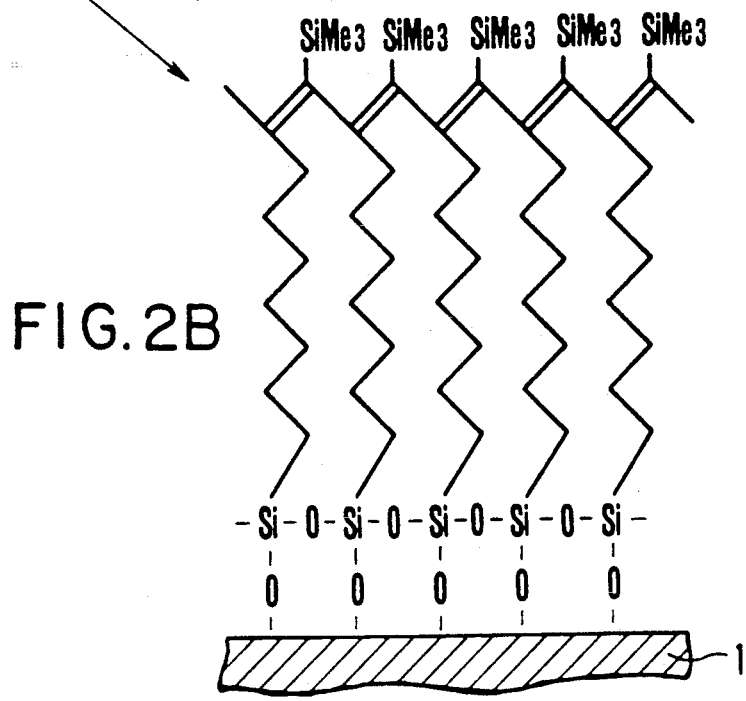
FIG. 2(b) is an enlarged sectional conceptional view, in molecular order, of a substrate on which a trans-polyacetylene has been formed by polymerization.

(ii) Further, it was confirmed that, when one layer of adsorbed film of 1-(trimethylsilyl)-ω-nonadecylynoic trichlorosilane (TMS-NTS: $Me_3Si$—C≡C—$(CH_2)_n$—$SiCl_3$) (though n was 17 herein, good results were obtained when n was in the range of 14 to 24) formed on the same Si substrate as above {FIG. 2(a)} was dipped in a solution Of $WCl_6$ (metallic catalyst) and $Bu_4Sn$ (co-catalyst) (1:1) in toluene and temperature of the solvent was elevated to about 30° to 70° C., trans-polyacetylene bond 3 having —$SiMe_3$ groups was formed as shown in FIG. 2(b).

Figure 3A:
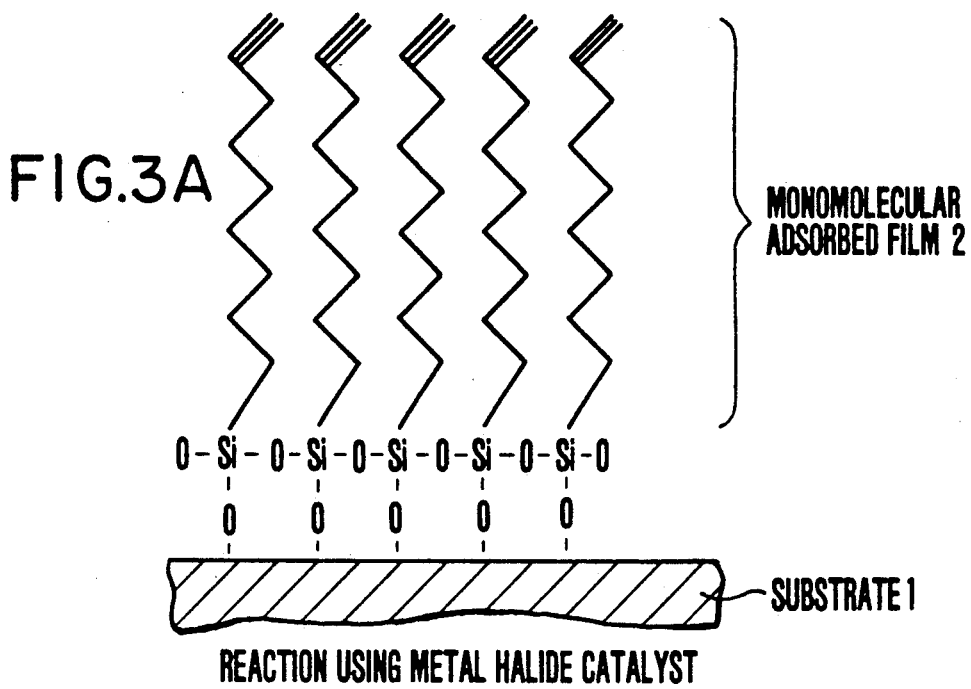
FIG. 3(a) is an enlarged section conceptional view, in molecular order, of a substrate on which one layer of NTS film is formed.
Figure 3B:
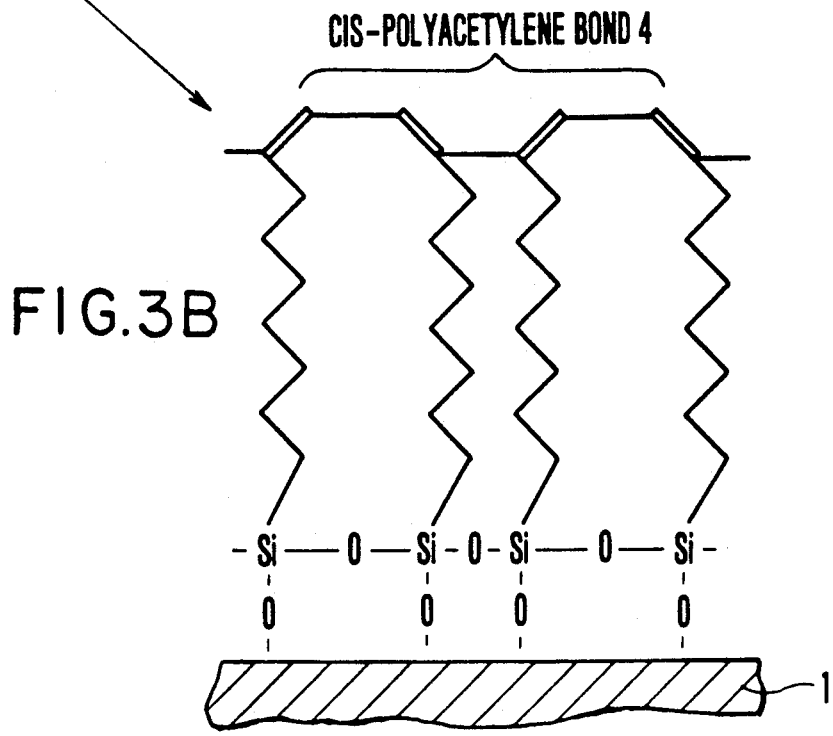
FIG. 3(b) is an enlarged sectional conceptional view, in molecular order, of a substrate on which a cis-polyacetylene has been formed by polymerization.

(iii) Moreover, it was confirmed that, when a silicon substrate on which one layer of NTS adsorbed film had been formed {FIG. 3(a)} was dipped in a solution Of $MoCl_5$ (metallic catalyst) in anisole (oxygen-containing organic solvent) and temperature of the solvent was elevated to about 30° to 70° C., cis-polyacetylene 4 was formed as shown in FIG. 3(b).

Figure 4A:
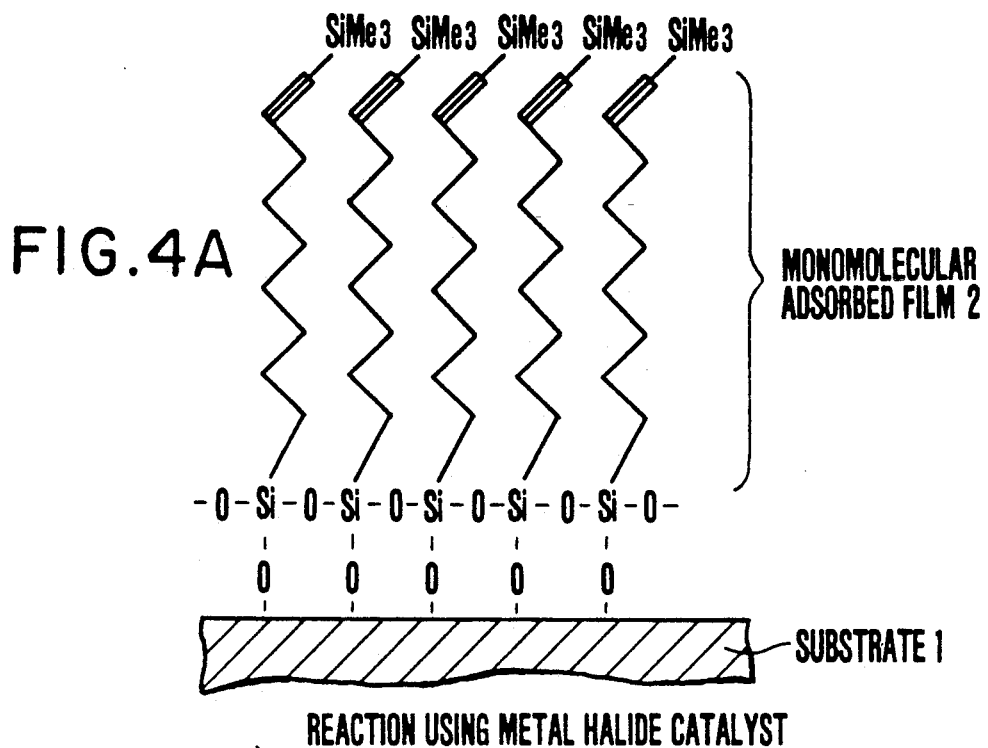
FIG. 4(a) is an enlarged sectional conceptional view, in molecular order, of a substrate on which one layer of TMS-NTS adsorbed film is formed.
Figure 4B:
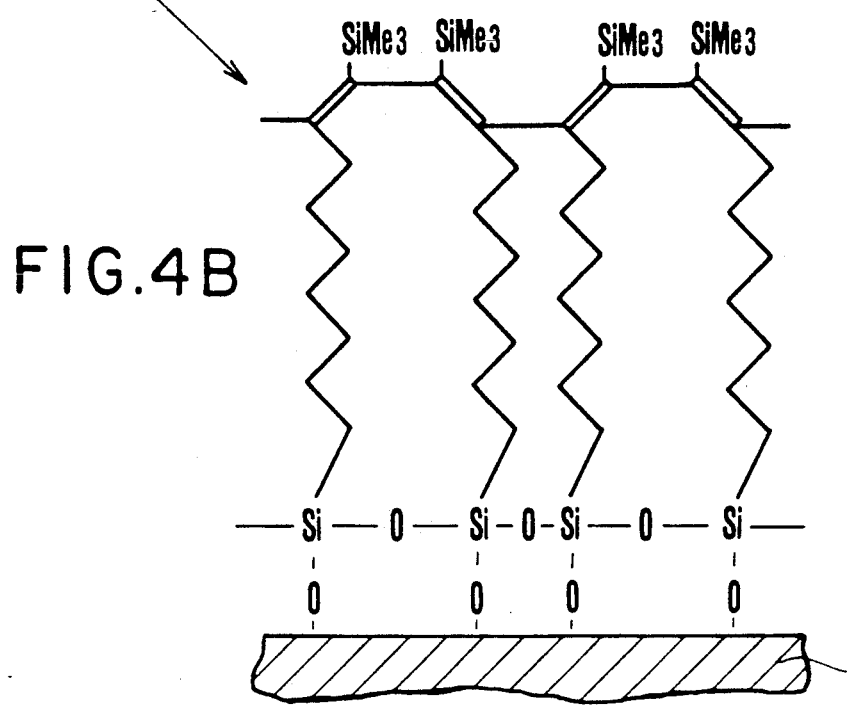
FIG. 4(b) is an enlarged sectional conceptional view, in molecular order, of a substrate on which a cis-polyacetylene has been formed by polymerization.

(iv) It was also confirmed that, when a Si substrate on which one layer of TMS-NTS adsorbed film had been formed {FIG. 4(a)} was dipped in a solution of $MoCl_5$ (metallic catalyst) and $Ph_3Bi$ (co-catalyst) (1:1) in anisole (oxygen-containing organic solvent) and temperature of the solvent was elevated to about 30° to 70° C., cis-polyacetylene 4 having —$SiMe_3$ groups was formed as shown in FIG. 4(b).

On the other hand, it was confirmed that the adsorbed films formed by the above-mentioned methods were insoluble in alcoholic solvents.

Based on the above-mentioned results, it was confirmed that a cis- or trans-polyacetylene can easily be produced according to the polymerization process of this invention.

As compared with the polyacetylene derivatives produced according to prior processes using Ziegler-Natta catalyst, the polyacetylenes produced in the above-mentioned manner were far more stable to heat, pressure and ultraviolet rays even in oxygen-containing atmospheres.

In the above-mentioned experiments, only the cases of NTS and TMS-NTS were studied. However, it is doubtless that the same process as above is applicable also to other acetylene compounds so far as they have acetylenic group (C≡C) in their molecules and can form an adsorbed film, even if the conditions of adsorption are different from those mentioned above.

(v) For example, also in case of using tricosadiynoic trichlorosilane having one diacetylenic group 6 {H—C≡C—C≡C—$(CH_2)_{19}$—$SiCl_3$; FIG. 5(a), 5(b)}, a monomolecular film of a polyacetylene type long conjugated polymer having trans-polyacetylene bond 3 {FIG. 5(d)} can be obtained by preparing a chemically adsorbed film {FIG. 5(c)} and thereafter polymerizing it with a metallic catalyst. Further, when the polyacetylene type long conjugated polymer obtained from the polydiacetylene is polymerized by irradiating it with electron beam (it may also be other radiations such as X-ray, gamma ray and the like), a polyacene type long conjugated polymer having polyacene bond 5 {FIG. 5(e)} is obtained.

In each of the experiments mentioned above, one layer of a chemically adsorbed film was formed and it was polymerized. Needless to say, however, the polymerization may be carried out after laminating the adsorbed film to form a multi-layer structure. Further, a multi-layer molecular film of polyacetylene can be prepared by alternately performing the formation of adsorbed film and the polymerization reaction.

EXAMPLE 2

(i) In this example, a case using ω-tricosynoic acid which is a kind of acetylene derivatives (TCA: CH≡C—$(CH_2)_n$—COOH; n is 20 herein, though good results were obtained when n was in the range of 14 to 23) will be mentioned.

LB film was built-up in a clean room of class 100 illuminated with yellow light from which the lights below 500 nm were cut off by the use of Joyce-Loebl Trough IV. The atmosphere in the clean room was conditioned at a temperature of 23±1° C. and a humidity of 40±5%. The substrate used for building-up of LB film was an Si substrate on which an oxide film having a diameter of 3 inches had been previously formed. In the polymerization reaction, $MoCl_5$, $WCl_6$, $NbCl_5$, $TaCl_5$, $Mo(CO)_5$, $W(CO)_6$, $Nb(CO)_5$ and $Ta(CO)_5$ could be used as the metal halide catalyst. As the organic solvent, toluene, dioxane and anisole could be used.

By building-up LB film of ω-tricosynoic acid (TCA) on Si substrate 11 by use of a water phase containing an inorganic salt such as $CaCl_2$ or the like, monomolecular film 12 having a molecular arrangement shown in FIG. 6(a) was obtained. Then, by dipping the substrate on which one layer of LB film of ω-tricosynoic acid was built up, into a solution Of $MoCl_5$ (metallic catalyst) in toluene and elevating the temperature of the solvent to about 30° to 70° C., trans-polyacetylene bond 13 shown in FIG. 6(b) was formed. Formation of 13 was confirmed by FTIR. When $WCl_6$, $NbCl_5$ or $TaCl_5$ was used as the catalyst, a polymeric film could be obtained similarly, although its molecular weight was different from that of the above-mentioned polymeric film. When the substrate was dipped in a solution Of $Mo(CO)_6$ or $W(CO)_6$ (catalyst) in $CCl_4$ solvent and it was irradiated with ultraviolet ray, a reddish brown polymeric film was obtained, although its molecular weight was different from the above.

Figure 7A:
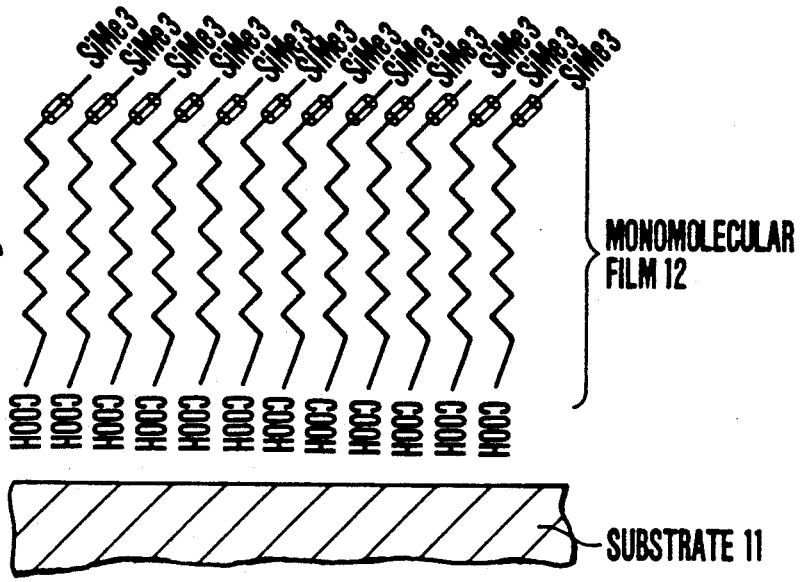
FIG. 7(a) is an enlarged sectional conceptional view, in molecular order, of a substrate on which one layer of 1-(trimethylsilyl)-1-tricosanoic acid LB film is formed.
Figure 7B:
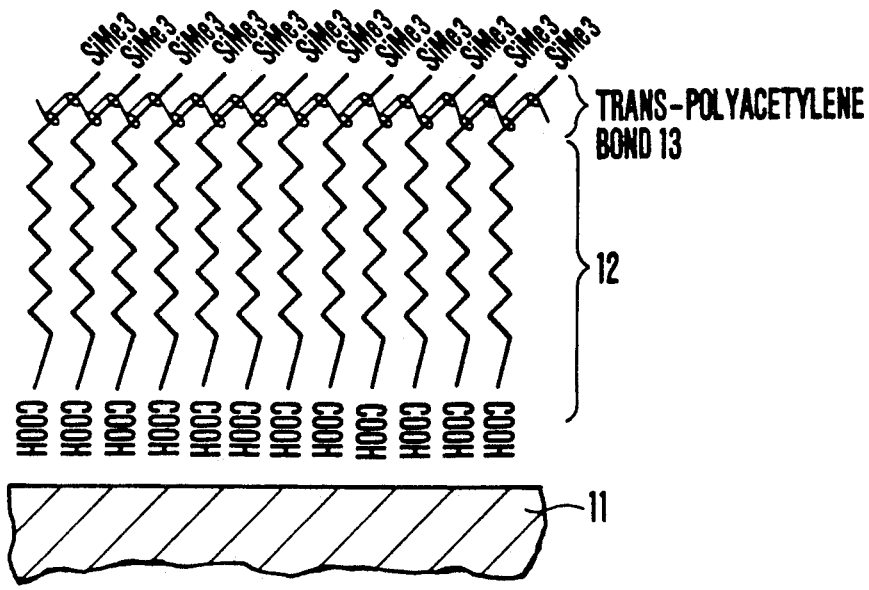
FIG. 7(b) is an enlarged sectional conceptional view, in molecular order, of a substrate on which a trans-polyacetylene has been formed by polymerization.

(ii) Further, when a Si substrate on which one layer of LB film of 1-(trimethylsilyl)-ω-tricosynoic acid (TMS-TCA: $Me_3Si$—C≡C—$(CH_2)_n$—COOH; n was 20 herein, though good results were obtained when n was in the range of 14 to 23) was built-up {FIG. 7(a)}, was dipped in a solution of $WCl_6$ (metallic catalyst) and $Bu_4Sn$ (co-catalyst) (1:1) in toluene and temperature of the solvent was elevated to about 30° to 70° C., trans-polyacetylene bond 13 having —$SiMe_3$ groups was formed as shown in FIG. 7(b). This was revealed by FTIR.

Figure 8A:
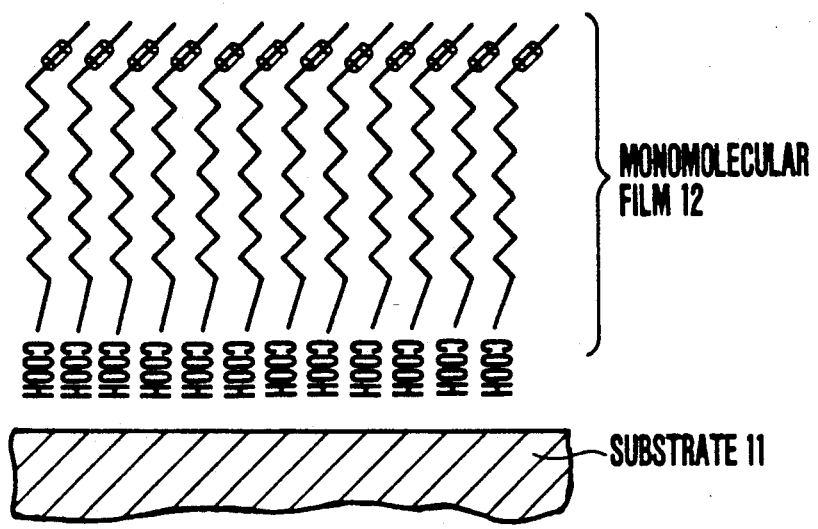
FIG. 8(a) is an enlarged sectional conceptional view, in molecular order, of a substrate on which one layer of TCA LB film is formed.
Figure 8B:
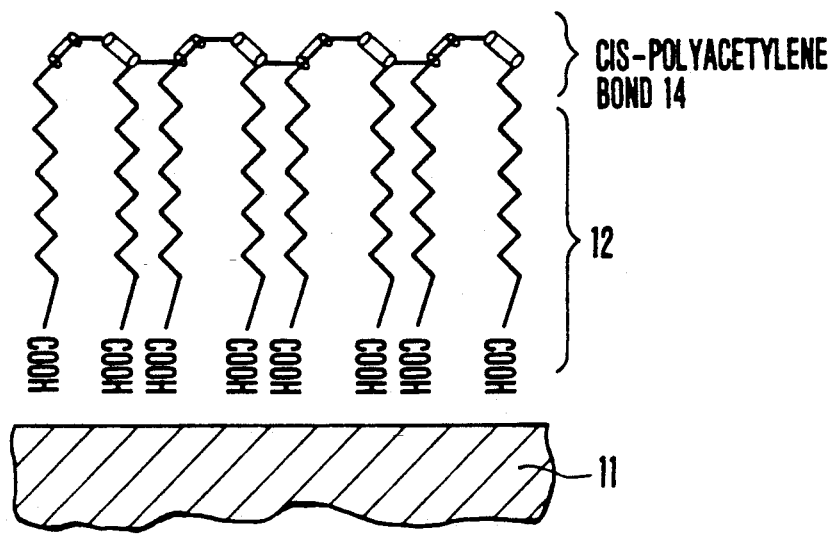
FIG. 8(b) is an enlarged sectional conceptional view, in molecular order, of a substrate on which a cis-polyacetylene has been formed by polymerization.

(iii) Furthermore, when a Si substrate on which one layer of LB film of ω-tricosynoic acid was formed {FIG. 8(a)}, was dipped in a solution of $MoCl_5$ (metallic catalyst) in anisole (oxygen-containing organic solvent) and temperature of the solvent was elevated to about 30° to 70° C., cis-polyacetylene 14 was formed as shown in FIG. 8(b). Its formation was confirmed by FTIR.

Figure 9A:
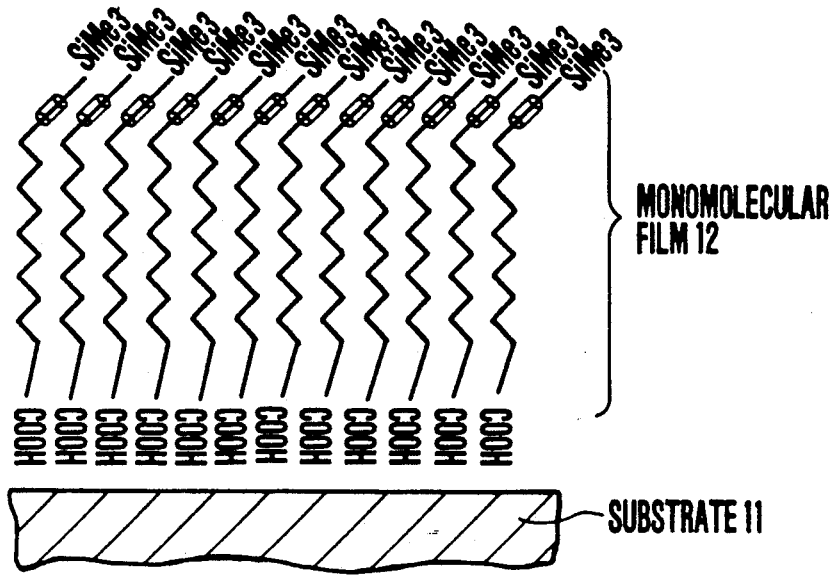
FIG. 9(a) is an enlarged sectional conceptional view, in molecular order, of a substrate on which one layer of 1-(trimethylsilyl)-1-tricosanoic acid LB film is formed.
Figure 9B:
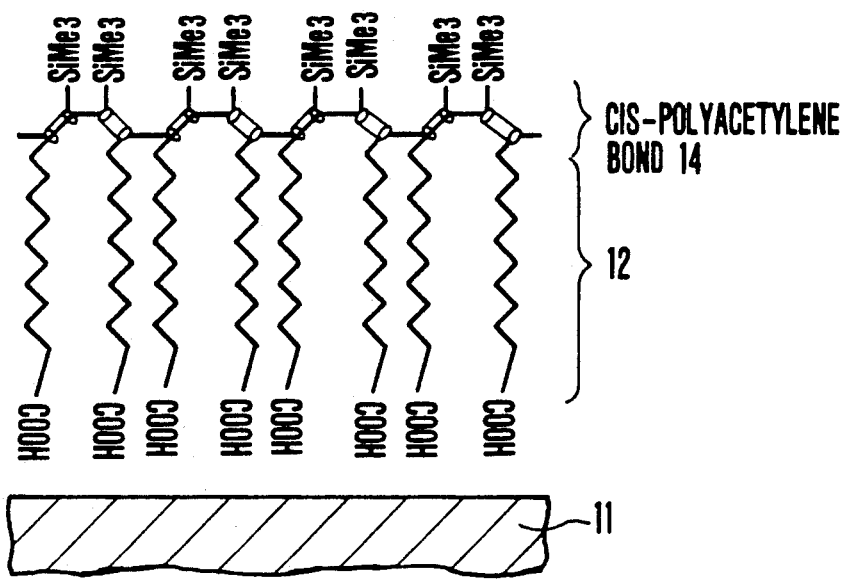
FIG. 9(b) is an enlarged sectional conceptional view, in molecular order, of a substrate on which a cis-polyacetylene has been formed by polymerization.

(iv) Moreover, when a Si substrate on which one layer of LB film of TMS-TCA was formed {FIG. 9(a)}, was dipped in a solution Of $MoCl_5$ (metallic catalyst)

and Ph₃Bi (co-catalyst) (1:1) in anisole (oxygen-containing organic solvent) and temperature of the solvent was elevated to about 30° to 70° C., cis-polyacetylene 14 having —SiMe₃ groups could be produced as shown in FIG. 9(b). This was revealed by FTIR.

It was confirmed that the LB films formed by the above-mentioned processes were insoluble in alcoholic solvents.

Based on the above-mentioned results, it was confirmed that a cis- or trans-polyacetylene can easily be produced according to the polymerization process of this invention.

As compared with polyacetylene derivatives produced by prior process using Ziegler-Natta catalyst, the polyacetylenes produced in the above-mentioned manner were far more stable to heat, pressure and ultraviolet ray even in an oxygen-containing atmosphere.

When a direct current bias of several tens volts was applied in the direction of water surface at the time of gathering the acetylene derivative molecules with a barrier on the water surface in the direction of surface and building-up them, orientation of the monomer molecules was furthermore improved and a polyacetylene type long conjugated polymer having a longer conjugated bond was prepared.

In the experiments mentioned above, only the cases of ω-tricosynoic acid and TMS-TCA have been mentioned. However, it is doubtless that the same process as above is applicable also to other acetylene derivatives so far as they have an acetylenic group (C≡C) in their molecules and can form LB film, even if the conditions of building-up may be different from the above.

(v) For example, when pentacosadiynoic acid {H—C≡C—C≡C—(CH₂)₂₀—COOH; FIG. 10(a)} having one diacetylenic group 16 is formed into LB film {FIG. 10(c)} and thereafter polymerized by the use of a metallic catalyst, a monomolecular film of a polyacetylene type long conjugated polymer having trans-polyacetylene bond 13 {FIG. 10(d)} is obtained. Further, when the polyacetylene type long conjugated polymer obtained from the polydiacetylene is polymerized by irradiating it with electron beams (it may also be other radiations such as X-ray, gamma ray and the like), a polyacene type long conjugated polymer having polyacene type bond 15 {FIG. 10(e)} is obtained.

In each of the experiments mentioned above, one layer of LB film was built-up and thereafter polymerized. However, the polymerization may be carried out after building-up many layers of LB film. Further, it is also possible to produce a polyacetylene type long conjugated polymer film having a multi-molecular layer by alternately carrying out the building-up and the polymerization reaction.

According to the process of this invention, a stable polyacetylene type long conjugated polymer quite excellent in electrical conductivity and nonlinear optical effect can be produced with a high efficiency. Theoretically, it is possible to produce a straight chain, high molecular weight polyacetylene type of super long conjugated polymer of which continuous conjugated bond has a length of several millimeters or more than several centimeters by using the process of this invention, and therefore the process of this invention is quite effective for production of devices utilizing nonlinear optical effect. Further, it is expected in the future to produce a straight chain, super high molecular weight, stable, polyacetylene type of polyacene type long conjugated polymer of which continuous conjugated bond has a length of several tens centimeters or more than several meters by finding the optimum kind of starting acetylene of diacetylene derivative monomers and the optimum production conditions. This suggests a possibility that an organic super conducting substance requiring no cooling may be producible according to the process of this invention.

What is claimed is:

1. A process for producing a film having conjugated polyacetylenic bonds which comprises dipping a substrate having a $-(CH_2)_n-$ group wherein n represents an integer of 14 to 24, an acetylenic group and —Si—Cl group in a first nonaqueous organic solvent to form a monomolecular film of said substance on said substrate by chemical adsorption and then dipping the substrate on which said monomolecular film has been deposited into a second organic solvent containing a metallic catalyst which is selected from the group consisting of MoCl₅, WCl₆, NbCl₅, TaCl₅, Mo(CO)₅, W(CO)₆, Nb(CO)₅, and Ta(CO)₅ to polymerize the acetylenic group part of the monomolecular film.

2. A process for producing film according to claim 1, wherein said acetylenic group is a diacetylenic group.

3. A process for producing a film according to claim 1, wherein said acetylenic group is linked to —SiMe₃ group.

4. A process for producing film according to claims 1, 2 or 3, wherein the second organic solvent contains, in addition to said metallic catalyst, an organo-Sn compound or an organo-Bi compound as a co-catalyst.

5. A process for producing film according to claim 4, wherein the second organic solvent is an oxygen-containing organic solvent and said metallic catalyst is MoCl₅.

6. A process for producing a film according to claim 1, wherein said substance having an acetylenic group and —SiCl group is a compound represented by the following general formula:

$$RC \equiv -C-(CH_2)_n-SiCl_3$$

wherein R is —H or SiMe₃ and n is an integer of 14 to 24.

7. A process for producing a film according to claims 1 or 2, wherein said substance having an acetylenic group and —SiCl group is ω-nonadecylynoic trichlorosilane or 1-(trimethylsilyl)-ω-nonadecylynoic trichlorosilane.

* * * * *